Dec. 8, 1931. F. M. YOUNG 1,835,624
DEVICE FOR BRAZING
Filed Jan. 26, 1931 2 Sheets-Sheet 2
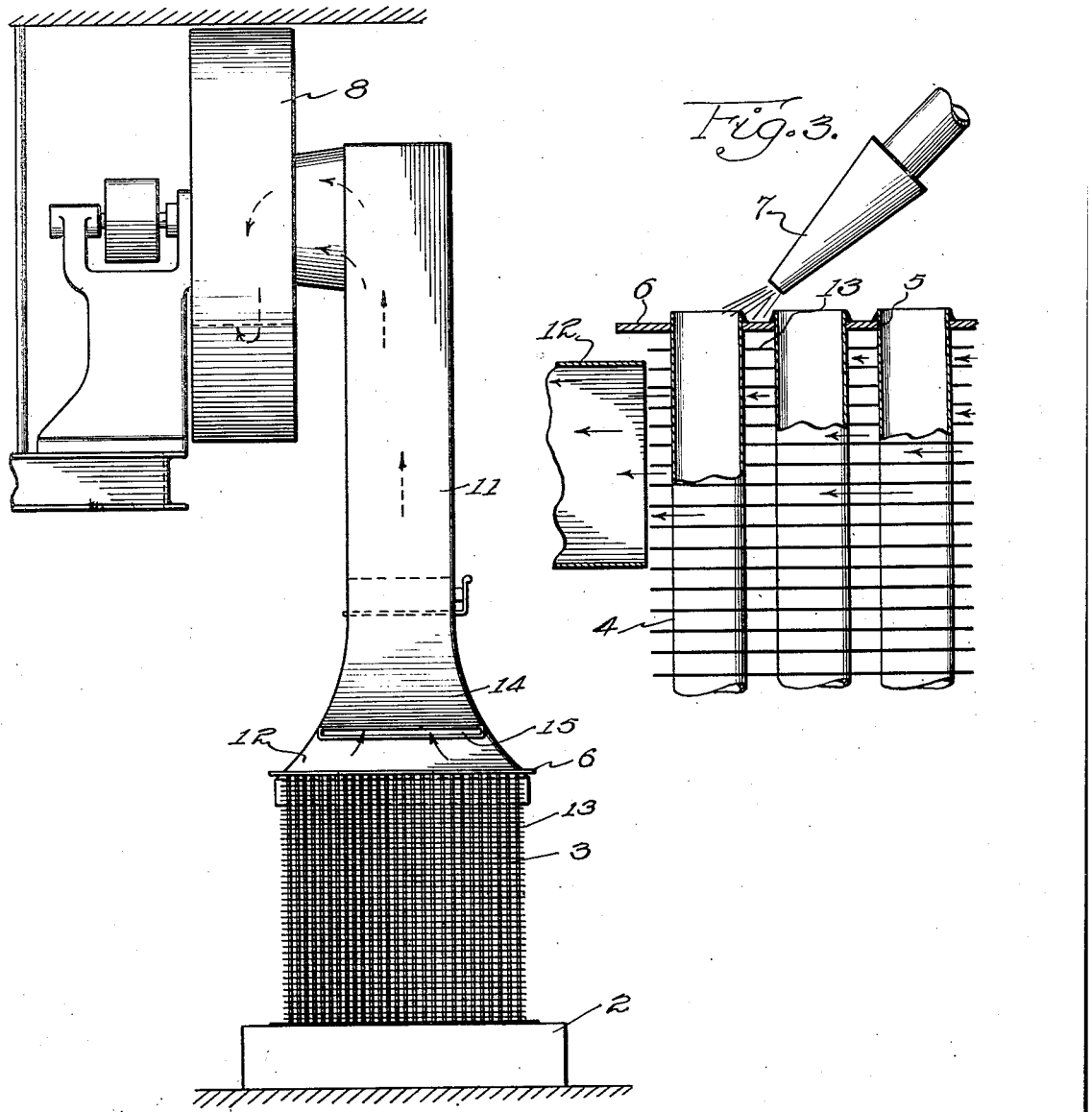

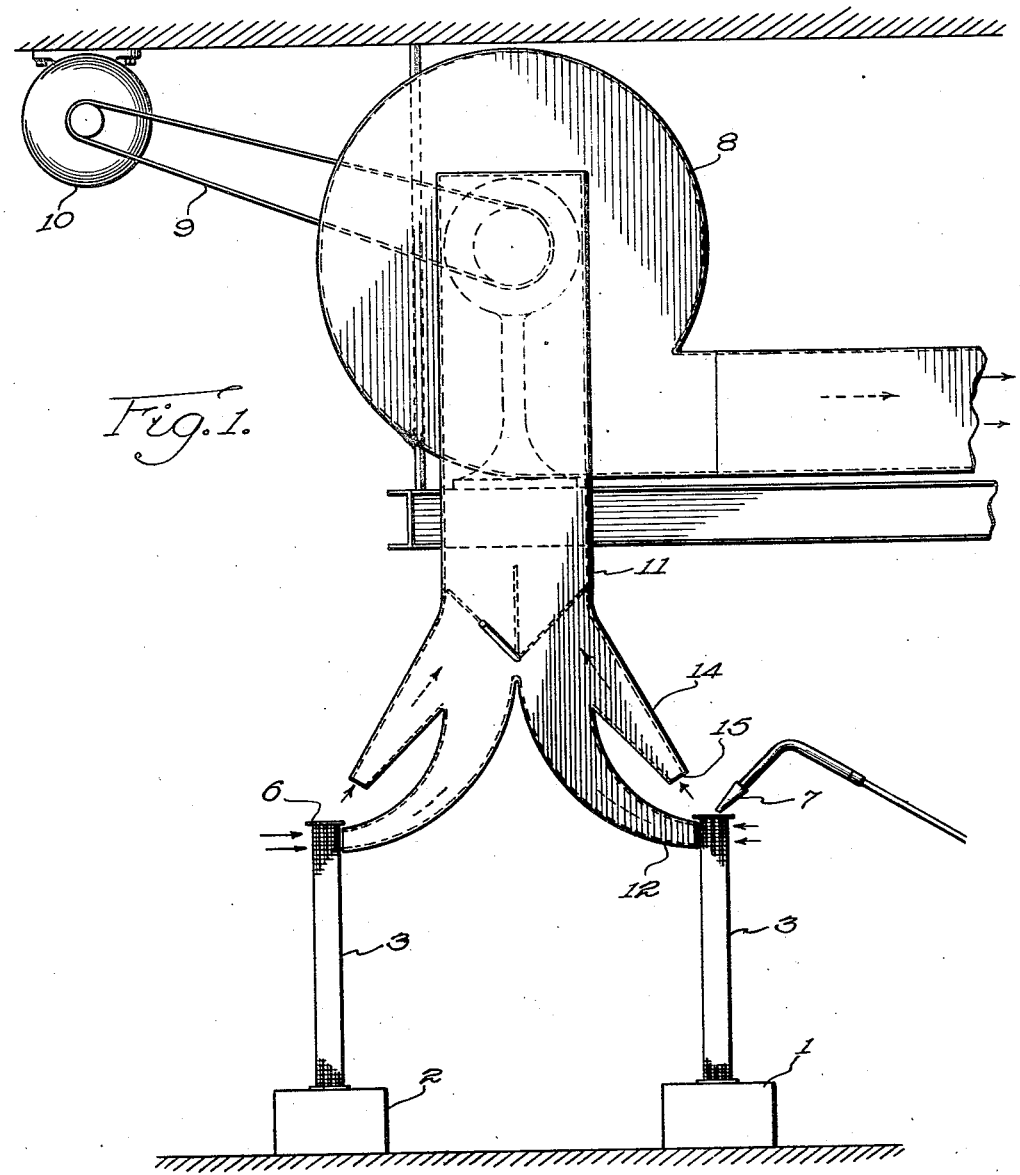

Patented Dec. 8, 1931

1,835,624

UNITED STATES PATENT OFFICE

FRED M. YOUNG, OF RACINE, WISCONSIN

DEVICE FOR BRAZING

Application filed January 26, 1931. Serial No. 511,334.

This invention relates to methods and apparatus for brazing, hard soldering, or performing similar operations in the joining of metal parts, especially the joining of parts of heavy section to parts of lighter section, such as the tubes and header sheets of unit heaters built of copper and similar sheet metals.

The main object of this invention is to provide suitable apparatus for making joints by brazing, especially where one of the parts consists of thin tempered metal to be connected to a heavier part, and which permits the use of temperatures at the joint which closely approach the fusing point of the metals joined without endangering the strength or drawing the temper from the thinner metal part adjacent the joint, and also permits the use in such work of spelters or solders having a melting point which closely approaches the temperature of fusion of the metals which are joined. A further object is to provide means for rapidly cooling the thinner part adjacent the brazed joint to dissipate heat therefrom at proper rate to prevent injury from overheating without however interfering with the brazing operation. A further object is to provide apparatus of this kind which will at the same time draw off the fumes arising from the brazing operation.

The purposes of the invention are accomplished by the method and apparatus illustrated in the drawings, in which:

Figure 1 is a side elevation of a brazing stand designed for use in brazing copper radiator tubes to the header tube sheets, a pair of radiator cores being shown in position thereon.

Fig. 2 is an end view of the same.

Fig. 3 is an enlarged fragmentary detail, partly in section, illustrating the relationship between a brazing torch, the article operated upon, and the air suction nozzles.

The improved method and apparatus as herein illustrated and described is designed for use in connection with the manufacture of heat transfer units made up of tempered thin copper tubes assembled with transverse fin sheets and having their ends connected to header plates. These structures when used in space heaters are frequently subjected to considerable steam pressure within the tubes, and if the temper has been drawn from the end portions of the tubes by overheating on being brazed to the header plates, there is a likelihood of the tubes being of insufficient strength for the intended steam pressure. This results in the likelihood of the tubes bulging at the places where they were subjected to such excess temperatures and consequently reducing the air space between the tubes and decreasing the efficiency of the heater by interfering with the intended flow of air between the tubes.

The apparatus shown is designed for supporting heater cores during the brazing operation thereof, and includes means for subjecting the tubes to a draft of cooling air sufficiently near the ends thereof to hold at safe temperature all portions except those portions which are within and being joined to the header plates. The apparatus is also provided with additional intake nozzles suitably located for drawing off the fumes created by the brazing torch and spelter.

The drawings show supports 1 and 2 for the cores 3, upon which the brazing operations are to be performed. The cores 3, as illustrated, consist of a bank of copper radiator tubes 4 having their ends seated in apertures 5 in the header plate 6, and having their body portions connected together by the usual fin plates 13.

The header plates and tubes may be of hard copper having approximately the same fusing temperatures but the header plates are usually about twice the thickness of the tube walls. In order to insure a good joint where the tubes fit the apertures 5, the two are brazed together with a spelter or hard solder having a fusing point not greatly below that of the tubes and header plates.

A torch is indicated at 7 for use in performing the brazing operation. The heat from this torch is localized at the joint by creating a strong draft of cooling air around the tubes just below the header plate 6.

For the purpose of creating the desired flow of air, blower 8, driven by belt 9 and motor 10, has an intake conduit 11 terminating in the intake nozzles 12, the mouths of which extend along the sides of the upper ends of the heater cores 3. By this means a draft of cooling air is drawn through the radiator between the fins 13 thereof, and around the tubes 4 near their upper ends just below the header plate 6, where the brazing operation is performed. The heat of brazing is in this manner localized to near the joint and cannot affect the strength and temper of the tubes below the header plate.

In order to have efficient heat transfer when in service, the tubes are made as light as possible in view of the pressures to which they are to be subjected, a usual proportion being a thickness of .02 inches for the tube stock and .05 inches for the header plate.

The conduits 11 have branch nozzles 14, the mouths 15 of which are above the articles operated upon, in position for drawing off the fumes which are generated during the brazing or soldering operations.

In practicing the invention, the blower is driven at the speed required for properly cooling the work operated upon according to the character of the brazing or soldering operation. If spelters or solders are employed which fuse at a comparatively high temperature, heat is applied accordingly by means of a torch 7. In order to prevent the heat from traveling down the tubes 4, at a rate sufficient to injure the tubes, the latter are cooled by a draft of air induced therearound as indicated by the arrows in the drawings. By means of this method and the apparatus shown, it is possible to attain strong joints without harmful effects upon the articles of work. In practice with metal of the thickness mentioned above, I have found the best results with an air velocity through the core at the suction nozzle of about 2000 feet per minute.

It will be understood that the apparatus herein described may be modified with respect to various details without departing from the invention as defined by the following claims.

I claim:

1. An apparatus for brazing the header sheets and tubes of radiator cores comprising a support for holding a core with its header sheet at the top, an air blast nozzle positioned at one face of the core adjacent and below the header sheet and means for creating an air flow at said nozzle.

2. An apparatus for brazing the header sheets and tubes of radiator cores comprising a support for holding a core with its header sheet at the top, and air exhausting means having a nozzle located immediately below said header sheet for drawing a current of air across the tubes.

3. An apparatus for brazing the header sheets and tubes of radiator cores comprising a support for holding a core with its header sheet at the top, and air exhausting means having a pair of nozzles located one immediately below said header sheet for drawing a current of air across the tubes, and the other above and spaced from said tube sheet.

Signed at Racine this 23rd day of January, 1931.

FRED M. YOUNG.